United States Patent [19]

Murphy et al.

[11] 3,720,263

[45] March 13, 1973

[54] GAS WELL STIMULATION

[75] Inventors: Bob G. Murphy, Houston, Tex.; J. O. Scott, Tulsa, Okla.

[73] Assignee: Cities Service Oil Company, Tulsa, Okla.

[22] Filed: Oct. 13, 1970

[21] Appl. No.: 80,361

[52] U.S. Cl. ................................................ 166/303
[51] Int. Cl. ............................................. E21b 43/20
[58] Field of Search ............................... 166/303, 305

[56] References Cited

UNITED STATES PATENTS

| | | | |
|---|---|---|---|
| 3,524,504 | 8/1970 | Allen | 166/303 |
| 2,788,855 | 4/1957 | Peterson | 166/303 |
| 2,241,254 | 5/1941 | Garrison | 166/303 |
| 2,832,416 | 4/1958 | Allen | 166/303 |

*Primary Examiner*—Joseph H. McGlynn
*Attorney*—J. Richard Geaman

[57] ABSTRACT

The problem of reduction in productivity in gas wells due to connate water reducing gas permeability about the wellbore is overcome. Dry gas is injected into the production well in sufficient quantities to remove the majority of the water which restricts gas flow about the well. The dry gas is obtained from gas produced from a well completed in the formation at some distance from the well being dried and stimulated. Gas produced is passed over a drying agent, compressed and injected into the production well so that the wellbore in the vicinity of the formation is rendered free of water with a high permeability to gas resulting.

6 Claims, 2 Drawing Figures

BOB G. MURPHY,
J. O. SCOTT,
INVENTORS.

3,720,263

GAS WELL STIMULATION

BACKGROUND OF THE INVENTION

This invention relates to the recovery of gas from subterranean reservoirs. More particularly, the invention relates to the recovery of gases following a drying procedure such that the formation obtains a higher permeability to gas flow into the wellbore.

It has been found that a condition exists in gas producing formations in that a low relative permeability to gas flow in the formation is exhibited when the formation contains a considerable amount of water known as connate water. The connate water may be present in a sufficient saturation so as to reduce the gas permeability, yet be at a low enough saturation such that it does not flow in a significant quantity. Thereby, due to the low flow of the connate water within the reservoir the water concentration remains as a permanent saturation in the reservoir, particularly about the wellbore, and restricts continued gas production from the formation. Flow of gas from the formation, being saturated with water, removes very little of the water from the formation through the well. Production of gas displaces water into the wellbore vicinity, but is relatively ineffective in removing the water from the wellbore for obtainment of maximum gas production rates from the wellbore.

In many cases, damaged wellbores in gas wells have caused the gas wells to be abandoned. Many of these reservoirs were extensively stimulated by aqueous fluid fracturing and thought to be incapable of achieving a productive capacity. By the use of a proper stimulation technique, some of these wells could have been proved to be productive. Considerably higher well drilling success ratios would have resulted in enormous reserves of gas released for industry consumption. A stimulation technique is required which can improve and provide an unrestricted wellbore area from which these formations may be produced.

It is an object of the invention, therefore, to provide a process for the recovery of gas from low permeability natural gas reservoirs.

It is another object of the invention to provide an improved technique for the stimulation of a subterranean gas reservoir.

It is still a further object of the present invention to provide a process for the recovery of gas from a subterranean reservoir by use of the gas produced from the same formation at a distant point which is reconditioned so as to act as a drying agent within the wellbore of interest.

With these and other objects in mind, the present invention is hereinafter set forth with particular reference to the following discussion and description in the drawings.

SUMMARY OF THE INVENTION

The objects of the present invention are accomplished by a process for removing the connate water saturation of a reservoir about a gas production well. The process comprises injecting a dry gas in the production well through the wellbore thereof at a pressure sufficient to invade the reservoir and dry the connate water from the wellbore. In particular, the dry gas may be heated such that injection into the formation both dries the connate water and evaporates the connate water so that it is conducted a considerable distance into the reservoir before it condenses and returns to its liquid connate water state within the reservoir matrices. The heated dry gas may consist of hot flue gas which may be produced by burning and dehydrating natural gas produced from the reservoir. The dry gas may also consist of natural gas produced from the reservoir which is dried and reinjected into the reservoir without heating. The heating and drying requirements are dependent upon the connate water saturation, permeability of the reservoir and wellbore for the gas injection and the amount of connate water which must be removed before a productive wellbore is obtained.

BRIEF DESCRIPTION OF THE DRAWINGS

The present invention may be more fully understood by referral to drawings of the present invention in which.

DETAILED DESCRIPTION OF THE INVENTION

To overcome the inherent restriction in gas permeability of a normally completed gas well into a formation having a high connate water saturation, dry gas is injected into the production well. Sufficient quantities of gas are injected so as to remove the major concentration of the water restricting gas flow about the well. The gas injected into a production well with a high connate water saturation may consist of any suitable inert gas which may be dried such that it may then contain and dry a sufficient amount of water from the wellbore. Gases selected from the group consisting of air, natural gas, carbon dioxide, dry flue gas, ethane and propane may be utilized with the present invention to both absorb the connate water in the vicinity of the wellbore and also dry the connate water from the wellbore such that an increased permeability to gas is achieved.

It is preferred in the application of the present invention that the dry gas be obtained by producing gas from a well completed into the same formation which is to be stimulated. The gas produced may be dried by passing it through a solid or liquid drying agent such that it is dehydrated into a dry gas which may be utilized within the process of the present invention. The gas is then generally compressed to a pressure in excess of the formation pressure and injected into the well to be stimulated. As sufficient volumes of dry gas are injected, the connate water saturation is reduced so as to alleviate the major portion of the restriction to gas productivity. The flow of gas is then reversed with the resulting stimulated well being capable of producing at higher rates for a given pressure drawdown than obtainable previously. Produced gas from a stimulated well may then be dried and injected into another well or wells to further stimulate other wells within the field. Subsequent stimulation may be required for already stimulated wells as connate water once again encroaches the wellbore. Therefore, a cyclic injection or production schedule may be followed whereby natural gas is produced from some wells within the reservoir, dried and reinjected into other wells to stimulate those wells where the natural gas production has resulted in a reestablished connate water buildup. Therefore, those wells from which gas was originally derived, dried and used to stimulate other wells must be again reconditioned. By this method, produced gas from the stimulated well may then be dried and injected into another well or wells to achieve stimulation of all the wells in the field to form an optimum production schedule of natural gas from unrestricted wells throughout the reservoir.

Figure 1:
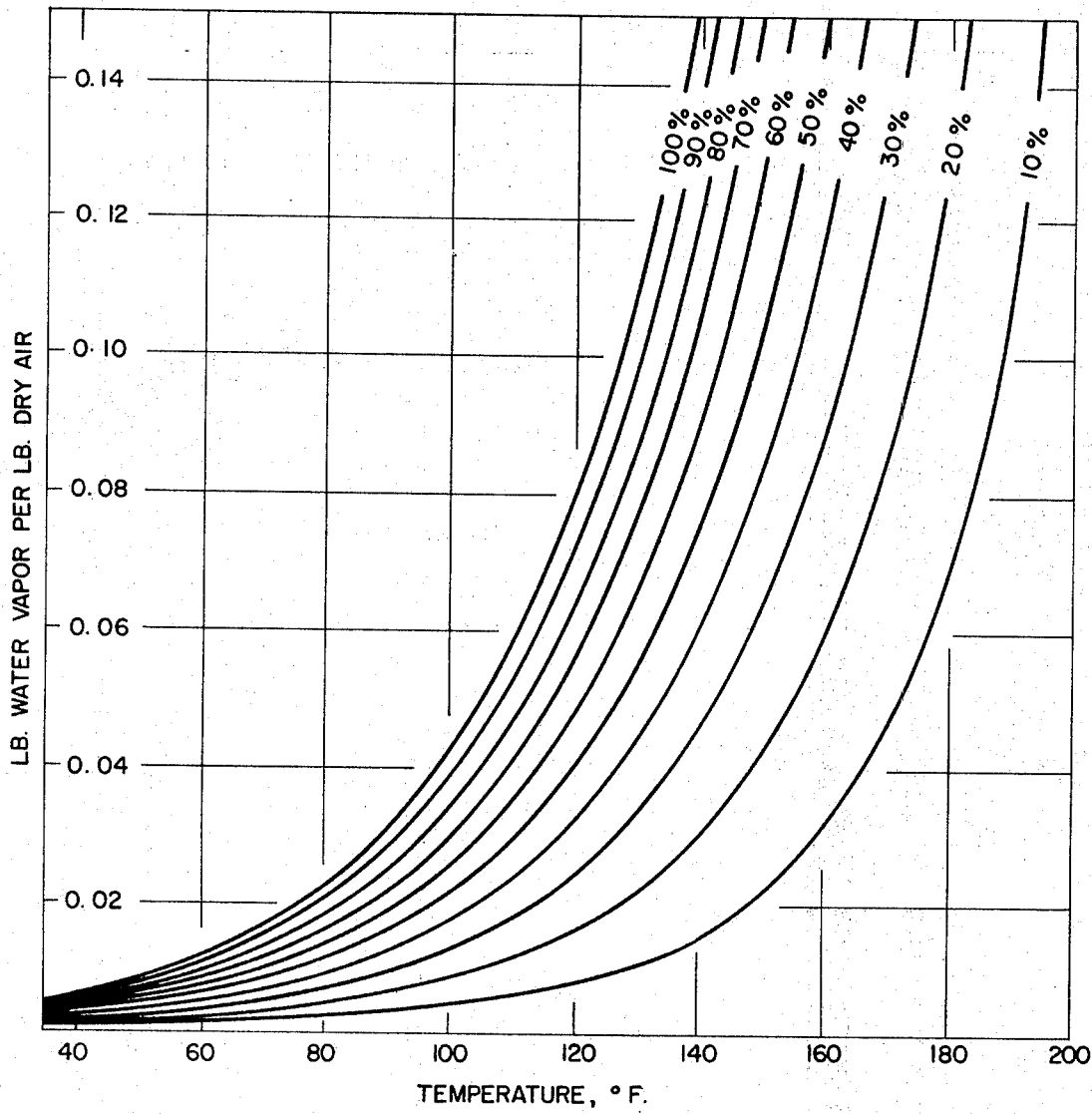
FIG. 1 represents the saturation of water in air at various temperatures as may be utilized in the present invention.

As an example of the stimulating effect of the process of the present invention, FIG. 1 is presented in which is depicted a saturation curve for water and dry air at various temperatures. Also depicted on the curve are the humidities. It can be seen that should dry air be injected into a wellbore and gas formation, having a high volume of water saturation thereby restricting gas flow therefrom, the dry air will remove a considerable amount of water from the vicinity of the wellbore. This removal is due both to evaporation and subsequent saturation of the dry air and also driving of the connate water as a fluid bank from the wellbore by an immiscible gas drive process.

A particular facet of the present invention is the heating of the gas before it is injected into the reservoir. This embodiment of the invention will normally be practiced when particularly heavy concentrations of connate water exist in the wellbore. The hot gases may be derived by passing the gases disclosed above through a heat exchanger before their introduction into the reservoir. In the application of a natural gas produced from the reservoir, the natural gas may be burned in the presence of air prior to its injection into the production well. The burning produces a hot flue gas which when dehydrated will drive the connate water from the wellbore and evaporate the connate water about the wellbore such that the permeability to the gas within the formation is increased and the wellbore stimulated. Generally, injection temperatures from about 200°F. to 1,000°F. are preferred.

Figure 2:
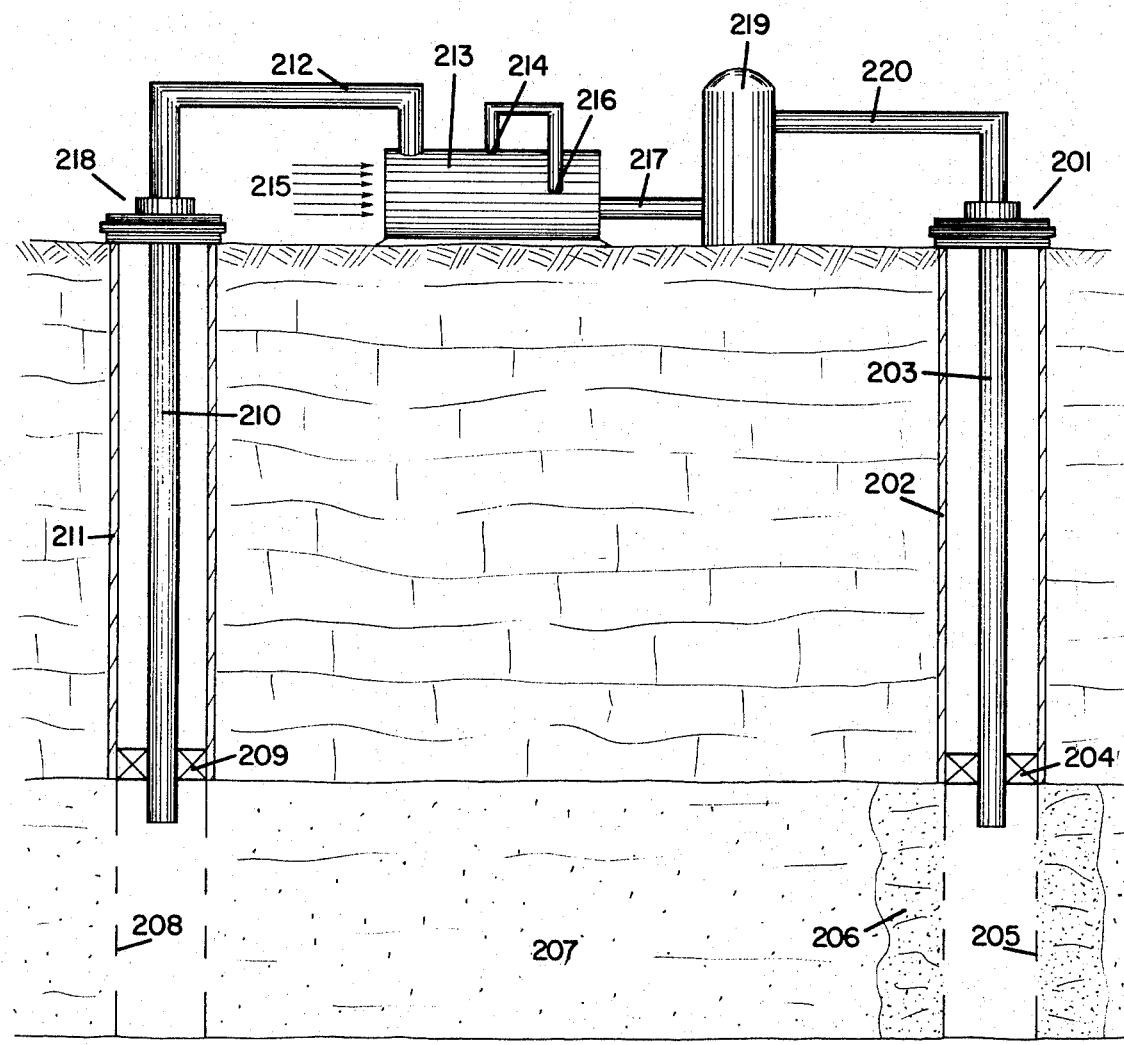
FIG. 2 represents the process of the present invention as subjected to the cross-sectional view of a reservoir in which it is supplied.

The latter disclosed process is more particularly illustrated by referral to FIG. 2 in which a production well 201 is converted to a dry gas injection well having tubing string 203 hung within completed casing 202 and having a perforated liner 205 which is restricted to production or injection through the tubing string 203 by isolation means, for example packer 204. A heavy concentration of connate water 206 about the wellbore within the gas formation 207 restricts production from the well such that the process of the present invention is required to clean up the wellbore and allow an increased gas flow therethrough. Gas which is used for injection into well 201 is produced from well 218 which has tubing 210 hung within completed casing 211 and has a perforated liner 208 which covers the entire interval of reservoir 207 and is isolated so as to produce through tubing string 210 by isolation means, for example the packer 209. Gas is produced from the wellhead of well 218, through production tubing 212 and is introduced into the burn section of a compressor 213 with air 215 such that the flue gas produced is recycled through line 214 into the compression inlet 216 of the compressor, compressed and injected into line 217 leading to absorber 219 where the flue gas is dehydrated. The dried gas is conveyed through injection line 220 and introduced into well 201. Hot-dry flue gas is thereby introduced into the reservoir and both drives and dries the connate water 206 about the perforated liner 205 such that the well is regenerated and stimulated and increased gas production therefrom is derived.

As mentioned, it may not be required to heat the gas, should only a low concentration of connate water be contained about the wellbore, so that the gas may be produced by passing a semi-dry or wet gas through a drying agent such as those selected from the group consisting of silica gel, alumina, ethylene glycol, monoethanol amine and other suitable drying materials. The water concentration and moisture content of the gas is reduced to a level whereby it will act as a hydroscopic substance when it is introduced into the reservoir and will thereby have a high specificity for water. Generally, a water concentration less than about 2 percent by weight water in the gas is preferred. The gas both dries and absorbs the water about the wellbore and moves it a considerable distance into the formation. Subsequent production from a stimulated wellbore does not inadvertently produce the water which has been driven from the vicinity of the wellbore. A slow bleeding of the water back into the vicinity of the wellbore will occur, but the majority of that displaced will be bound within the reservoir at some distance from the wellbore and will not be readily produced back into those portions of the wellbore which it previously obstructed. Therefore, although a cyclic treatment may be required, the initial treatment of the wellbore and stimulation thereof will have a major effect upon gas production from the reservoir. Subsequent, shorter intervals of stimulation may be desirable, but in most cases not required.

The present invention, then, is a process by which gas producing formations having gas relative permeabilities lower than desirable, due to a high water content about the wellbore, may be stimulated. By use of the process described herein, an effective wellbore cleanup is obtained and a maximum gas production rate achieved.

The present invention has been described herein with respect to particular embodiments and aspects thereof. It will be appreciated by those skilled in the art that various changes and modifications can be made, however, without departing from the scope of the dependent claims.

Therefore, we claim:

1. A process for removing the connate water saturation of a reservoir about a gas production well, which comprises injecting a gas which has been dehydrated to less than about 2 percent by weight water into the production well through the wellbore thereof at a pressure sufficient to invade the reservoir and dry the connate water from the wellbore.

2. The process of claim 1 in which the dry gas is selected from the group consisting of dehydrated flue dehydrated gas, natural gas, carbon dioxide, ethane and propane.

3. The process of claim 1 in which the dehydrated gas is heated.

4. The process of claim 3 in which the dehydrated gas is heated to a temperature of about 200° F to about 1,000° F.

5. The process of claim 1 in which the dehydrated gas is natural gas produced from the reservoir which has been dehydrated.

6. The process of claim 5 further comprising burning the natural gas in the presence of air to form a flue gas and subsequently dehydrating the resulting flue gas.

* * * * *